United States Patent [19]
Yasuda

[11] Patent Number: 4,591,014
[45] Date of Patent: May 27, 1986

[54] ELECTRIC POWER STEERING EQUIPMENT

[75] Inventor: Tomio Yasuda, Kasugabe, Japan
[73] Assignee: Aisin Seiki Kabushiki Kaisha, Japan
[21] Appl. No.: 600,052
[22] Filed: Apr. 13, 1984
[30] Foreign Application Priority Data
  Sep. 22, 1983 [JP] Japan ................. 58-175695
[51] Int. Cl.⁴ ............................... B62D 5/04
[52] U.S. Cl. ................... 180/79.1; 180/163; 318/434
[58] Field of Search .......... 180/79.1, 163; 318/434; 361/31

[56] References Cited

U.S. PATENT DOCUMENTS 4,290,000 9/1981 Sun ..................... 318/434 X
4,530,413 7/1985 Buike et al. ............ 180/79.1

FOREIGN PATENT DOCUMENTS 0051515 12/1982 European Pat. Off. .
2758308 7/1979 Fed. Rep. of Germany ..... 180/79.1
   8467 1/1983 Japan ................. 180/79.1
1395954 5/1975 United Kingdom .

*Primary Examiner*—Tony M. Argenbright
*Attorney, Agent, or Firm*—Banner, Birch, McKie & Beckett

[57] ABSTRACT

An electric power steering apparatus particularly adapted for small mounting spaces, such as a front wheel drive vehicle. The apparatus includes an electric motor as a driving source thereof, wherein a reducer is coupled to a third steering shaft of a manual steering torque transmission mechanism and a current through the electric motor is controlled in accordance with the steering torque applied to the manual steering torque transmission mechanism based on the driver's steering operation, thereby to suppress the motor temperature below a predetermined level. The electric power steering apparatus includes at least one safety device such as a control means to control the load current not to exceed a predetermined value.

15 Claims, 10 Drawing Figures

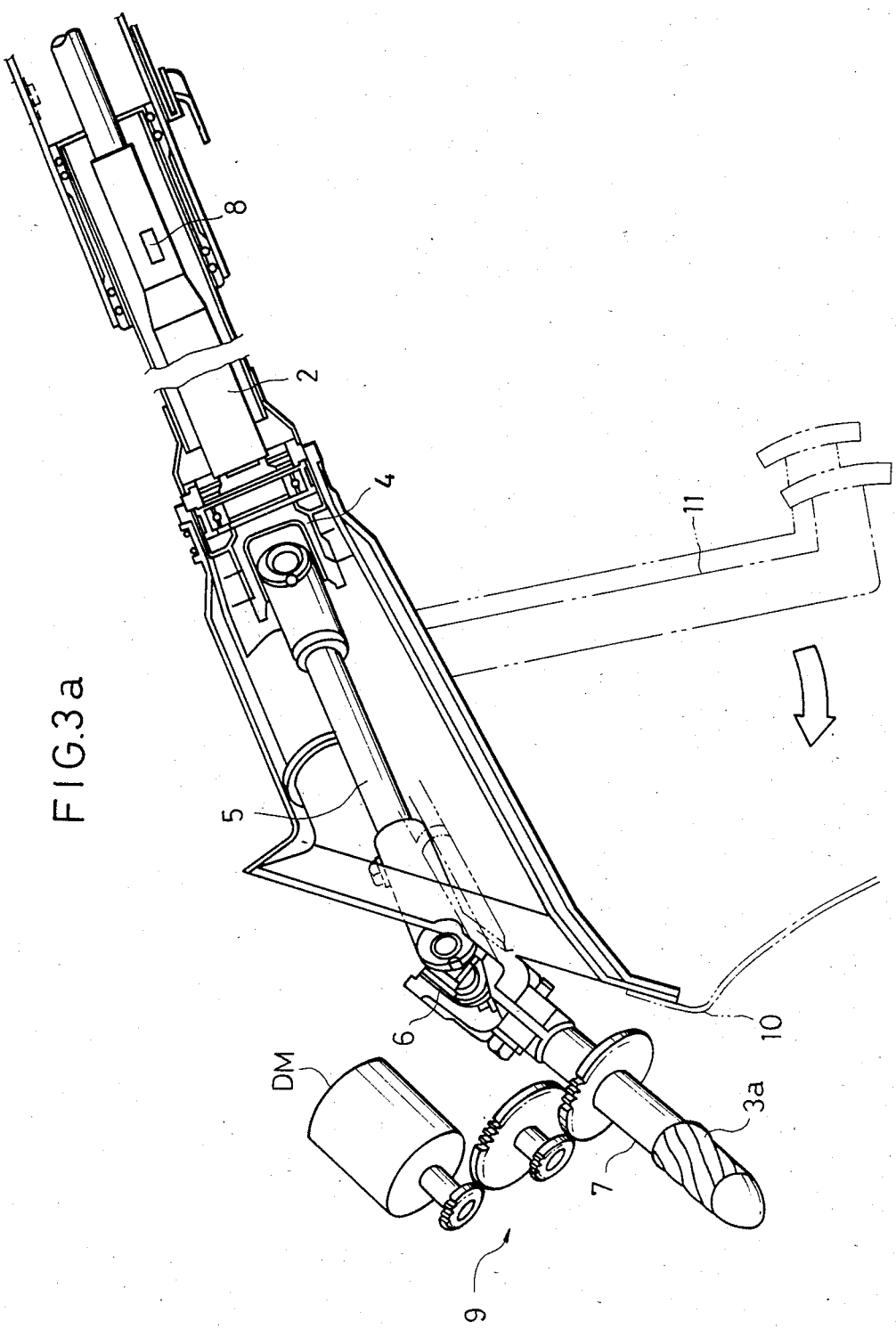

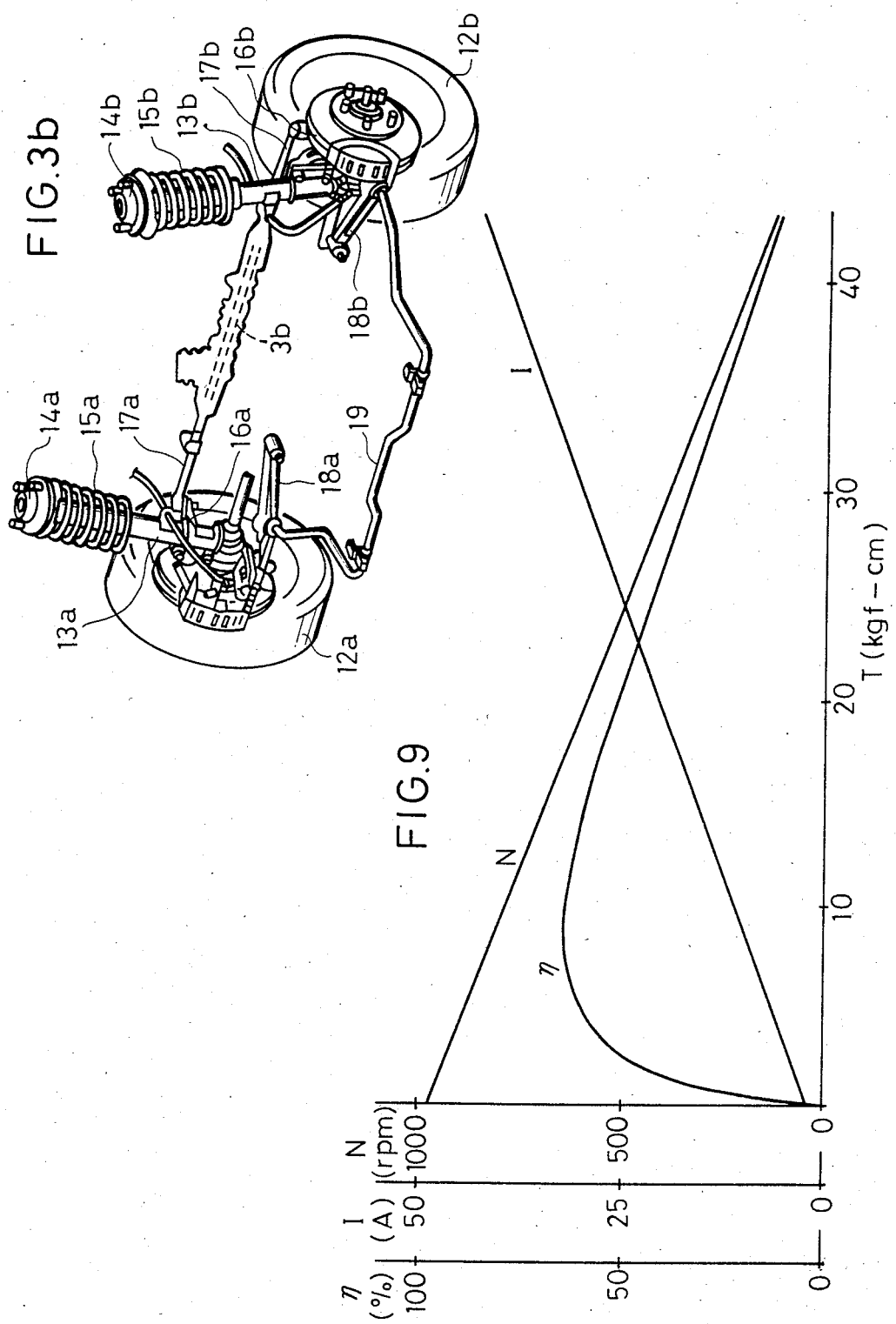

FIG.7
NORMAL DIRECTION ROTATION
ON-MODE
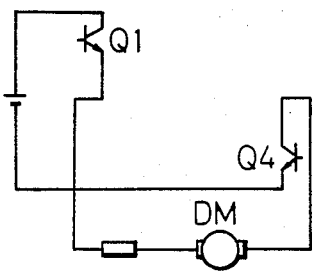
OFF-MODE
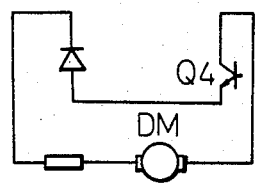
REVERSE DIRECTION ROTATION
ON-MODE
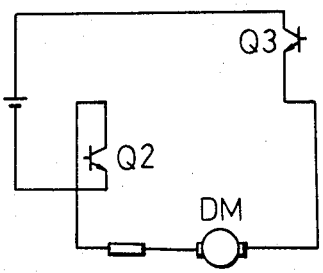
OFF-MODE
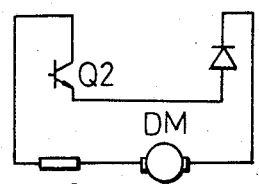
BRAKING
NORMAL DIRECTION
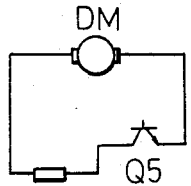
REVERSE DIRECTION
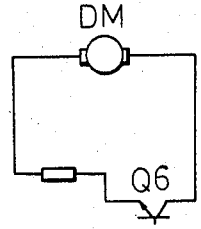

ELECTRIC POWER STEERING EQUIPMENT

BACKGROUND OF THE INVENTION

1. Field of the Invention

This invention relates to electric power steering equipment in which an auxiliary steering force is generated by an electric motor.

2. Description of the Prior Art

Power-assisted steering equipment for helping a driver to steer an automobile is well-known. In conventional power steering equipment, an auxiliary steering force is generated in accordance with the steering by a driver and the force thus generated is transmitted to a steering gear. Most of the power steering equipment put to practical use at the present time is actuated by a hydraulic drive. The hydraulic drive of conventional power steering equipment is equipped with a control valve, hydraulic cylinder and related structure to generate an auxiliary steering force by moving oil within the cylinder in accordance with a steering operation.

One significant disadvantage of the above-described known hydraulic power steering systems, especially in light of the trend toward smaller cars, is that the control valve, hydraulic cylinder and related structure are large in size. There is also encountered a large pressure loss within the connecting lines. To prevent this pressure loss, the line must be bent with a small curvature. However, in the case of a vehicle not having a large mounting space in the engine room, such as a front drive vehicle, these constraints make it difficult to mount the power steering equipment. Also, in conventional hydraulic drive units, an effective seal must be used to ensure that oil does not leak. Additionally, handling of the equipment is difficult.

In order to avoid the above-identified problems, it has been proposed to use a motor as a driving device for power steering equipment. With the use of such motors, however, there is a danger that the motor may burn out due to poor insulation if temperature of the motor is allowed to exceed a predetermined temperature.

In a motor-driven power steering unit, the mounting position of the power steering equipment in a vehicle is very important. Namely, it is necessary for the vehicle to have enough space to mount both the motor, as a driving device of the power steering equipment, and a reducer. The reducer reduces rotating speed of the motor and transmits the driving force to the steering gear. If the reduction gear ratio of the reducer is decreased, the reducer is capable of being miniturized. For this purpose, it is necessary for the reducer to be connected to the input side of the steering gear, that is, to the output side of a manual steering torque transmission mechanism. The reason for this required arrangement is that the rotating speed of the motor is first reduced by the reducer to be transmitted to the output side of the manual steering torque transmission mechanism, and then the reduced rotating speed is further reduced by the steering gear. Therefore, the reduction gear ratio of the reducer itself may be kept small.

In a usual vehicle, three steering shafts are disposed between the manual steering gear and the steering wheel. The steering shafts are connected to one another with predetermined inclination by means of universal joints.

The first steering shaft is connected to the steering wheel and is positioned inside the vehicle passenger compartment, also referred to as the vehicular room. In the vehicular room there is enough space to mount the power steering equipment, but the equipment thus mounted may obstruct the driving operation by the driver.

The second steering shaft is disposed between a toe board partitioning the vehicular room and the engine compartment. In this area, there are disposed various mechanical elements and, therefore, it is difficult to provide enough space to mount power steering equipment. In addition, since the second and third steering shafts are connected to each other with inclination of a predetermined angle, if the constant steering torque from the power steering equipment is applied to this second steering shaft, the steering torque transmitted to the third steering shaft fluctuates in the form of sine-wave, as shown in FIG. 1, in accordance with the steering angle. As a result, this fluctuating steering torque is applied to the steering gear even when the steering torque from the power steering equipment is constant.

There is relatively enough space in the vicinity of the third steering shaft for power steering equipment. However, since this third shaft is disposed in the engine compartment, temperature of the power steering motor is liable to rise, with a potential burn-out of the motor, because of poor insulation. A large-sized motor is relatively free from the temperature problems, but is difficult to mount because of its large size.

SUMMARY OF THE INVENTION

Accordingly, one object of the present invention is to provide improved electric power steering equipment which is free from the aforesaid temperature problems, and operates safely and with a high reliability.

Another object of the present invention is to provide improved electric power steering equipment which provides smooth steering without obstructing the driving operation by a driver.

A further object of the present invention is to provide improved electric power steering equipment which is small in size and which can be easily mounted in a vehicle.

These and other objects are achieved according to the present invention by connecting a reducer to a predetermined position in the above-described manual steering torque transmission mechanism. According to the invention, the reducer is positioned nearest to the steering gear, and thus, is connected to the third steering shaft.

Further, in order to maintain the temperature of the motor below a predetermined temperature and thus protect the motor from excessive, damaging temperatures, current through the motor is controlled in accordance with the steering torque applied to the manual steering torque transmission mechanism based on the steering operation by a driver. In addition, there is also at least one safety device in the electric power steering equipment according to the present invention which controls the load current and prevents it from exceeding a predetermined value.

Accordingly, an electric power steering apparatus according to the present invention comprises a manual steering torque transmission mechanism for transmitting torque from a steering wheel to a steering gear. The mechanism includes a plurality of steering shafts coupled to one another by a plurality of coupling elements, such as universal joints. A motor torque transmission mechanism, or reducer, is interposed between the steering gear and the coupling element which is nearest to the steering gear. The reducer is in turn coupled to an electric motor. A manual steering torque detecting means detects the manual steering torque in the steering shaft of the manual steering torque transmission mechanism. A load current detecting means detects a load current through the electric motor. A control means provides an input to the electric motor based on output signals from the manual steering torque detecting means and the load current detecting means. The control means supplys a load current based on the detected manual steering torque to the electric motor and the established limiting value of the load current, so as not to exceed a predetermined value.

BRIEF DESCRIPTION OF THE DRAWINGS

FIGS. 3a and 3b are respectively a longitudinal sectional view and a perspective showing details of mechanism elements in the embodiment of FIG. 2;

FIG. 7 is a block diagram showing an electrical connection in various operation modes;

FIG. 9 is a graph illustrating characteristics in a D.C. servomotor DM used in an embodiment according to the present invention.

DESCRIPTION OF A PREFERRED EMBODIMENT

Hereinafter, the present invention will be explained in more detail in accordance with a preferred embodiment thereof with reference to the accompanying drawings.

Figure 1:
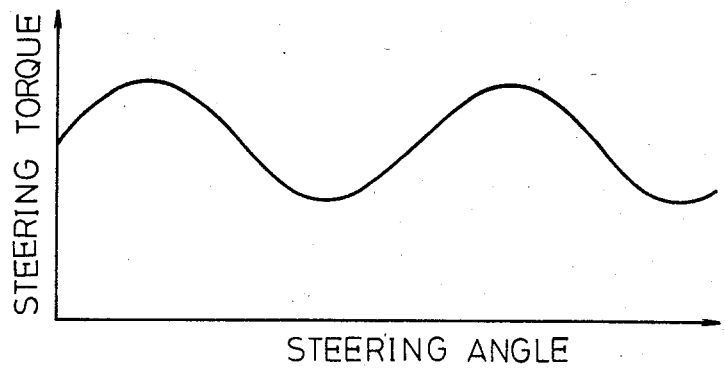
FIG. 1 is a graph illustrating the relation between the steering angle and the steering torque where the shaft of a motor is coupled to the second steering shaft via a reducer.
Figure 2:
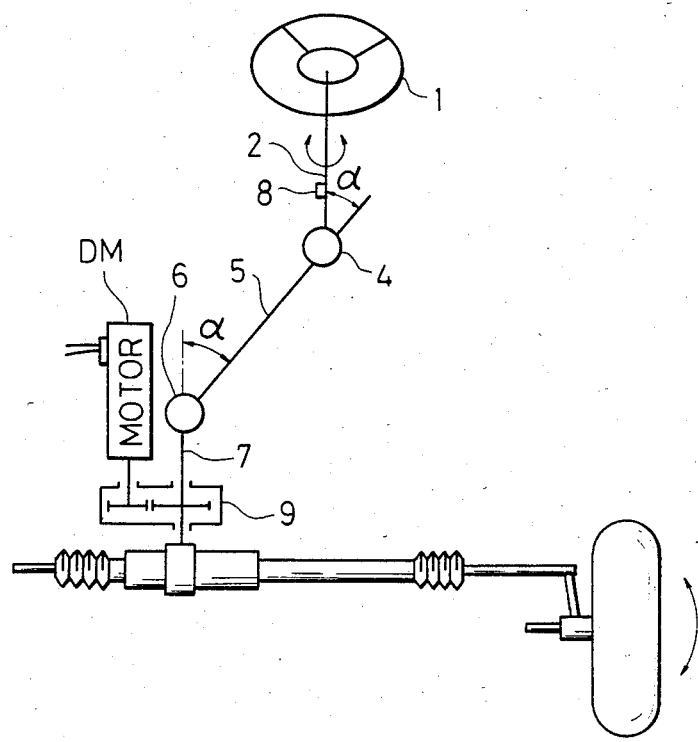
FIG. 2 is a schematic view showing an embodiment of an electric power steering device according to the present invention.

Referring now to FIGS. 2, 3a and 3b, a first steering shaft 2 is connected at one end thereof to a steering wheel 1, and it is also connected, at the other end thereof, to a second steering shaft 5 through a first universal joint 4. The second steering shaft 5 is also connected to a third steering shaft 7 through a second universal joint 6. The manual steering torque transmission mechanism according to this embodiment is composed of the aforesaid three steering shafts and two universal joints connected to one another as described above. In this case, an inclination angle α of the second steering shaft 5 relative to the first steering shaft 2 is the same as that of the second steering shaft 5 relative to the third steering shaft 7.

A D.C. servomotor DM is connected to the third steering shaft 7 through a reducer 9. In this embodiment, the reducer 9, which is composed of four gears combined to one another, is employed as a motor torque transmission mechanism thereby to reduce the rotation of D.C. servomotor DM to 1/6 and to transmit this reduced rotation of the motor DM to the third steering shaft 7.

A torque sensor 8 is fixed to the first steering shaft 2 as a manual steering torque detecting means. In this embodiment, a strain gauge is employed as the torque sensor 8. On FIGS. 2 and 3a, one torque sensor 8 is only illustrated, but another torque sensor 8 is also fixed to the back side of the torque sensor 8 illustrated on these figures so as to be fixed to the first steering shaft 2. According to this embodiment, torque applied to the steering shaft 2 is detected by sensing torsion of the shaft 2. Each of the torque sensors is provided with two strain gauges respectively different from each other in the detecting direction thereof. These four strain gauges are formed into a bridge circuit as will be described hereinafter thereby to effect temperature compensation.

The bottom end of the third steering shaft 7 is connected to a pinion gear 3a as shown in FIG. 3a. This pinion gear 3a engages with a rack 3b as shown in FIG. 3b. The rack 3b performs the steering of tires 12a and 12b through tie rods 17a, 17b, steering knuckle arms 16a, 16b and the like.

The steering mechanism illustrated in FIG. 3a mainly shows the second universal joint 6 which extends between an engine compartment to the left of a toe board 10 in FIG. 3a, and the vehicle interior or vehicular room to the right of toe board 10. Reference numeral 11 designates a brake pedal.

Referring to FIG. 3b, the respective rotary shafts of vehicular front tires 12a and 12b are supported by suspension upper supports 14a and 14b through shock absorbers 13a and 13b, respectively. Between the shock absorbers 13a, 13b and the suspension upper supports 14a, 14b, there are disposed coil springs 15a and 15b, respectively.

Steering knuckle arms 16a and 16b are coupled to bearings for the respective tires 12a and 12b. Arms 16a and 16b coupled to the rack 3b through tie rods 17a and 17b, respectively. Pinion gear 3a engages rack 3b. Lower suspension arms 18a and 18b and a stabilizer bar 19 are also shown in FIG. 3b.

Figure 4:
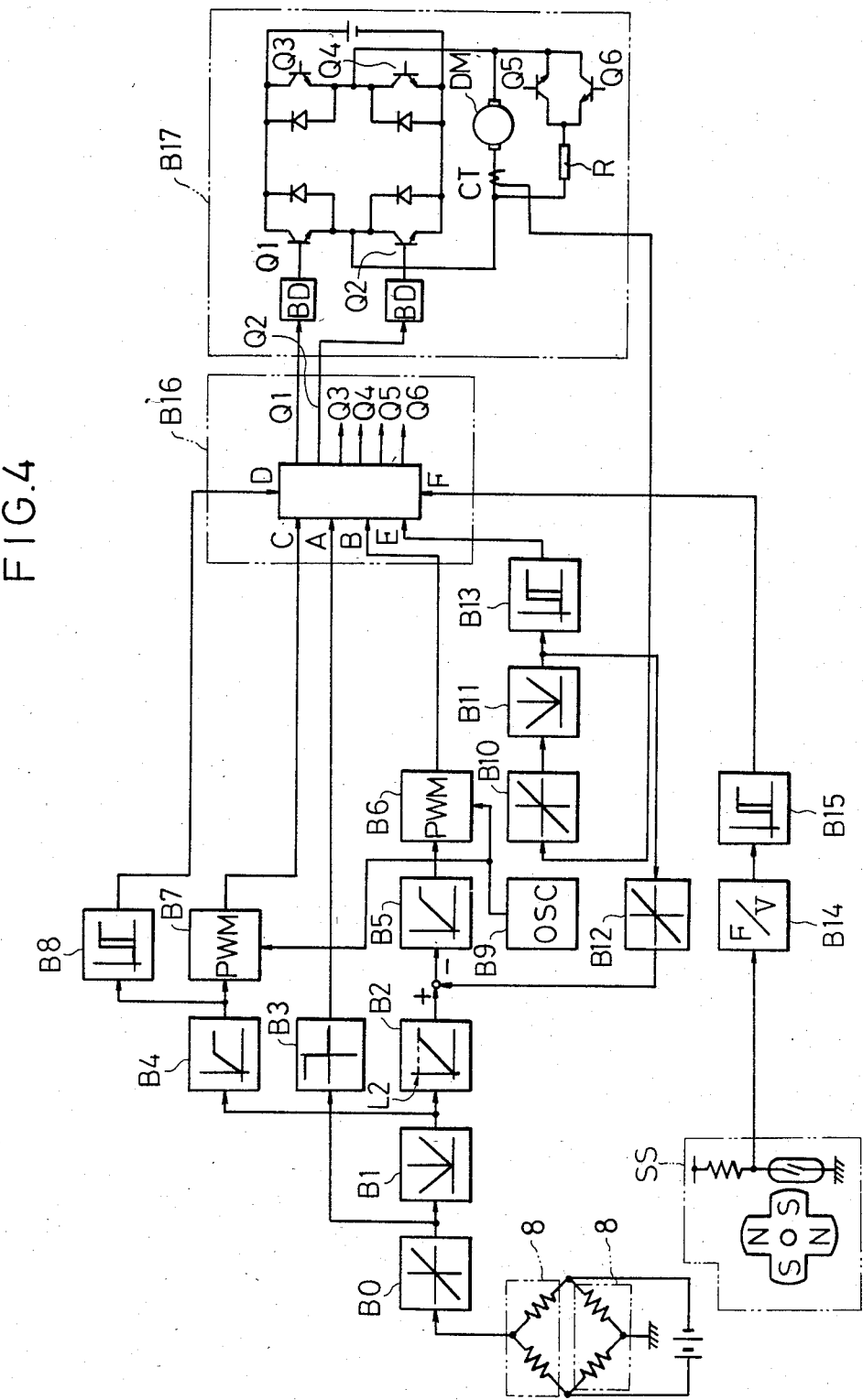
FIG. 4 is a block diagram showing an electric circuit of the embodiment of FIG. 2 in a schematic manner.
Figure 5:
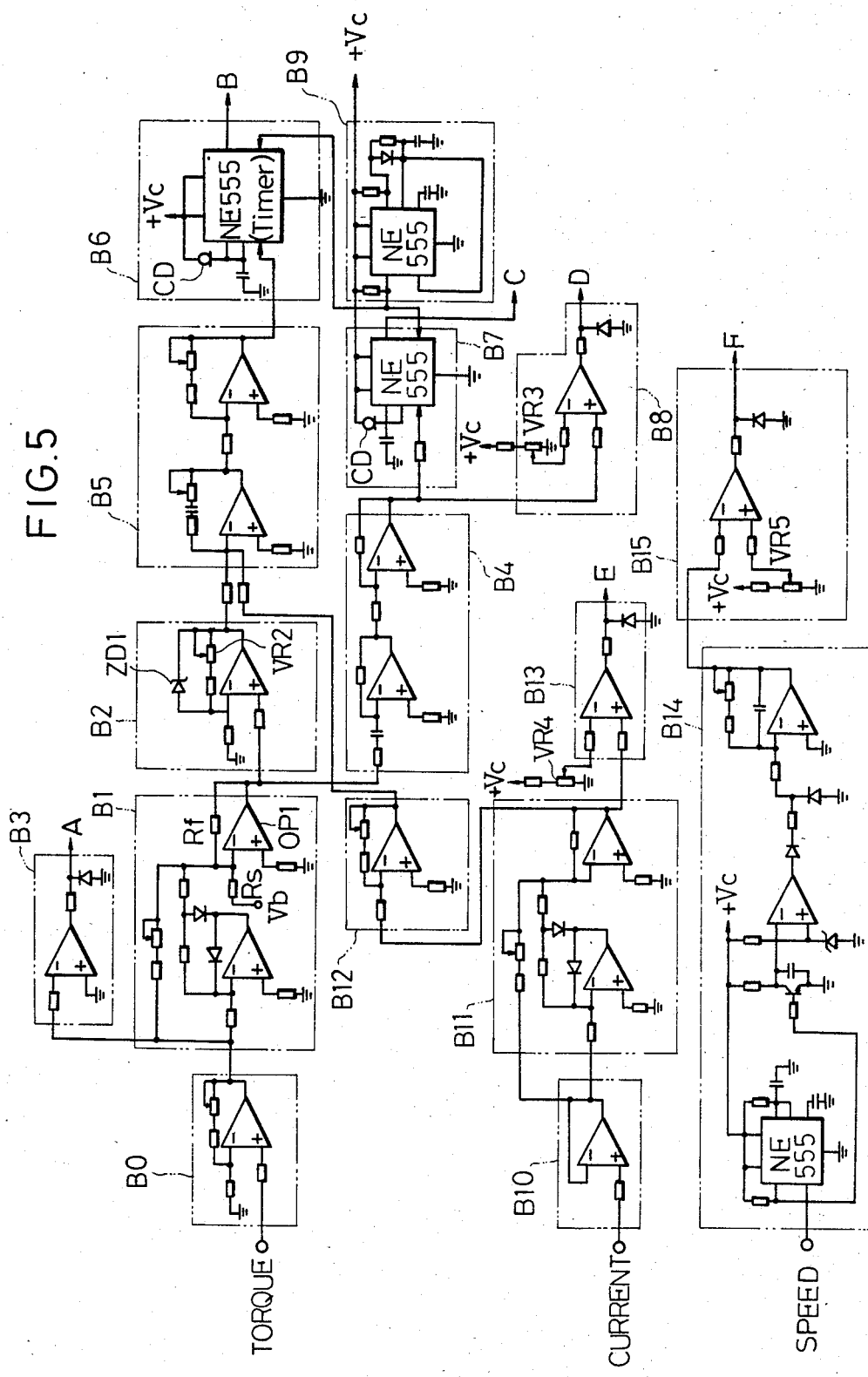
FIGS. 5 and 6 are block diagrams each of which shows details of the block diagram of FIG. 4.
Figure 6:
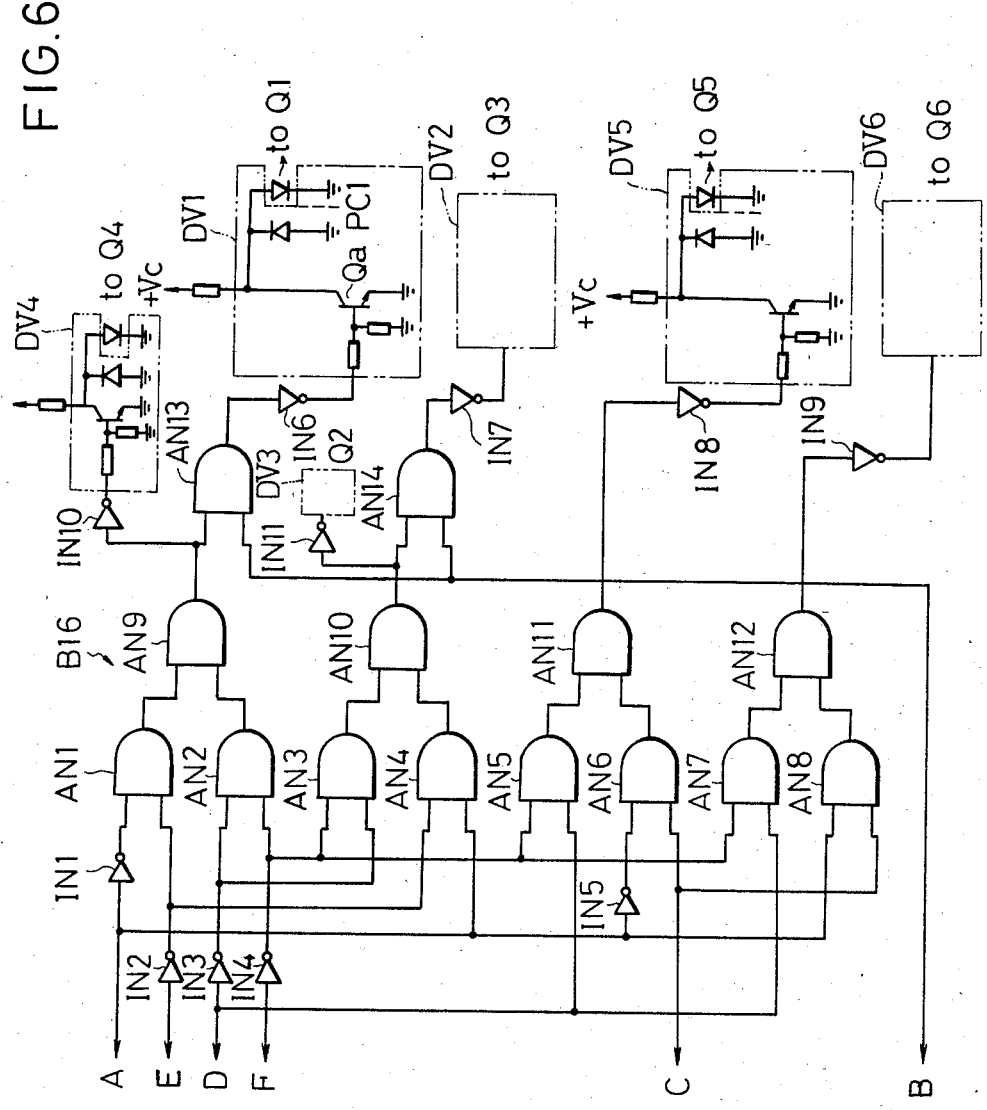

In FIG. 4, there is shown a block diagram illustrating the electrically constructed portion of the electric power steering equipment of this embodiment. FIGS. 5 and 6 show the detailed construction in the respective blocks of FIG. 4. Referring now to FIGS. 4, 5 and 6, a graph shown in each of the applicable blocks B1–B15 of FIG. 4 shows a schematic characteristic curve representing the relation between an input signal and an output signal of each of the blocks, wherein the input signal level and the output signal level are shown in the abscissa and in the ordinate, respectively. In only block B4, however, frequency of the input signal is shown in the abscissa and amplification degree thereof is shown in the ordinate. In FIGS. 5 and 6 a resistor is illustrated by a small rectangular mark.

The four strain gauges constituting the two torque sensors 8 are formed into a bridge circuit and an output terminal thereof is connected to an input terminal of block B0. The block B0 is composed of a linear amplifier and the output terminal thereof is connected to an input terminal of each of blocks B1 and B3.

Block B1 is composed of an absolute value circuit wherein an output signal of positive polarity is generated, regardless of the polarity of an input signal. Amplitude of the output signal is nearly equal to a constant times the absolute value of the input signal. In the embodiment shown, the output signal of the absolute value circuit B1 should provide a predetermined signal level which is not a ground level (0 level) even when the input signal level is a ground level (0 level). For this purpose, therefore, a D.C. bias voltage Vb is applied to an inversion input terminal of an operational amplifier OP1 via a resistor Rs, as shown in FIG. 5.

Block B2 is composed of an amplifier wherein the input signal level is linearly amplified until the output signal level becomes L2. When the output signal level reaches L2, block B2 continues to keep the aforesaid level L2 even when the input signal level rises higher. Namely, block B2 serves as a function generator. The level L2 is a predetermined value which can be defined by the characteristic of Zener diode ZD1, shown in FIG. 5. Therefore, even when a torque to be applied to the steering shaft 2 exceeds a predetermined value, the output signal level of block B2 does not exceed the level L2. Namely, block B2 serves so as to limit a load current of a motor lower than a predetermined value, as will be described later. In addition, by changing an amplification degree of block B2, it is possible to selectively define the distribution ratio of driving forces for a driver and for the D.C. servomotor as a source of steering force, respectively. The amplification degree of block B2 can also be changed by means of a variable resistor VR2. Namely, by adjusting VR2, it is possible to change the distribution of driving forces necessary for a driver to steer and for the motor DM.

The output signal of block B2 is applied to an input terminal of block B5 through an adder-subtractor. Block B5 is composed of a linear amplifier. The output terminal of block B5 is connected to a modulation input terminal of block B6. Block B6 is composed of a pulse width modulation (PWM) circuit and which modulates the pulse width of a square-wave, which is an output signal of block B9, in accordance with the output signal of block B5. As shown in FIG. 5, in blocks B6 and B7, CD designates a constant current diode. Block B9 is composed of an oscillator and oscillates a square wave having frequency of 2 KHz. The output terminal of block B6 is connected to an input terminal B of block B16. Block B16 is a control block.

Block B3 decides the level of the output signal thereof in accordance with the polarity of the output signal of block B0. In other words, the output signal of block B3 becomes a logic level (high level or low level) in accordance with the operational direction of the steering wheel 1. The output terminal of block B3 is connected to an input terminal A of block B16.

The output terminal of block B1 is connected to an input terminal of block B4. Block B4 is composed of a differentiation circuit which detects a sudden change in the steering operation, as will be described hereinafter. The output terminal of block B4 is connected to an input terminal of each of blocks B7 and B8. Block B7 is composed of a pulse width modulation (PWM) circuit. It receives as input the square-wave from block B9 and modulates the pulse width thereof by the output signal of block B4, in the same manner as block B6. The output terminal of block B7 is connected to an input terminal C of block B16. Block B8 is composed of a comparator and wherein the reference level thereof can be adjusted by a variable resistor VR3, shown in FIG. 5. The output terminal of block B8 is connected to an input terminal D of block B16. These blocks B4, B7 and B8 are effective to rapidly decrease torque of the servomotor DM.

To block B10, there is applied a feedback signal having a predetermined relation to the value of current through the D.C. servomotor. Block B10 is composed of a linear amplifier. The output signal of block B10 is applied to an absolute value circuit B11. The absolute value circuit B11 amplifies the absolute value of the input signal level thereby to output a signal of the amplified level therefrom. The output terminal of the absolute value circuit B11 is connected to an input terminal of each of blocks B12 and B13. Blocks B12 and B13 are composed of a linear amplifier and a comparator, respectively. The output signal of block B12 is added to (or subtracted from) an input signal of block B5, as shown in FIG. 4.

Block B13 is composed of a comparator wherein a logic level (high level or low level) of the output signal thereof is decided based on the judgment that the value of the current through the servomotor DM is, or is not, in excess of a predetermined value. In other words, if an overcurrent flows into the servomotor DM together with an abnormal temperature rise of the servomotor exceeding a predetermined temperature, block B13 outputs a signal to block B16 so as to cut off the load current. As a result, the D.C. servomotor DM can be prevented from being subjected to the abnormal temperature rise. The comparison level of this comparator B13, that is, the aforesaid predetermined value to be compared with the load current value, can be adjusted by a variable resistor VR4, shown in FIG. 5.

A car speed sensor SS is shown in FIG. 4. In this embodiment, the car speed sensor is composed of a magnet and a lead switch. The magnet is connected to a speed meter cable so as to rotate together with the rotation of the axle. The lead switch is opened (OFF) or closed (ON) in accordance with the magnetic variation caused by the rotation of the magnet, thereby to output a pulse signal whose frequency is in proportion to the car speed. This pulse signal is applied to block B14 which is composed of a F/V (frequency/voltage) conversion circuit.

The output signal of block B14 is applied to an input terminal F of block B16 via a comparator B15. The comparator B15 is provided with a variable resistor VR5 to vary the comparison level thereof. A control button of the variable resistor VR5 is disposed to such a position that a driver can operate it. In this embodiment, the comparison level of the comparator B15 is continuously set by means of the variable resistor VR5 within the range between 20 and 50 Km/h when converted into a car speed.

Six output terminals of the control block B16 are connected to switching transistors Q1 to Q6 via base drivers BD1 to BD6, respectively. These base drivers BD1 to BD6 drive bases of the respective transistors Q1 to Q6, respectively. The transistors Q1, Q2, Q3 and Q4 drive the D.C. servomotor DM and they are formed into a bridge so as to vary polarity of the load current. That is, when two transistors, which are positioned to the respective vertexes on the diagonal line so as to be opposed to each other, turn on, a current can be supplied to the servomotor DM with a predetermined polarity. Transistors Q5 and Q6 are used to brake the servomotor DM. Therefore, they, which are connected to each other in parallel, are connected to a resistor R in series and this series circuit therefore is also connected to the servomotor DM in parallel. CT designates a current transformer for detecting the load current.

Referring to FIG. 6, control block B16 comprises AND gates AN1 to AN14, inverters IN1 to IN11 and drivers DV1 to DV6. All of the drivers DV1 to DV6 have the same constructions as one another. The driver DV1 comprises a transistor Qa and a light emitting diode of a photo-coupler PC1. Photodiodes, each of which is in a pair of the light emitting diode of the photo-coupler in each of the drivers DV1 to DV6, are respectively included in base drivers BD1 to DB6, by which the bases of the transistors Q1 to Q6 are driven, respectively.

Figure 8:
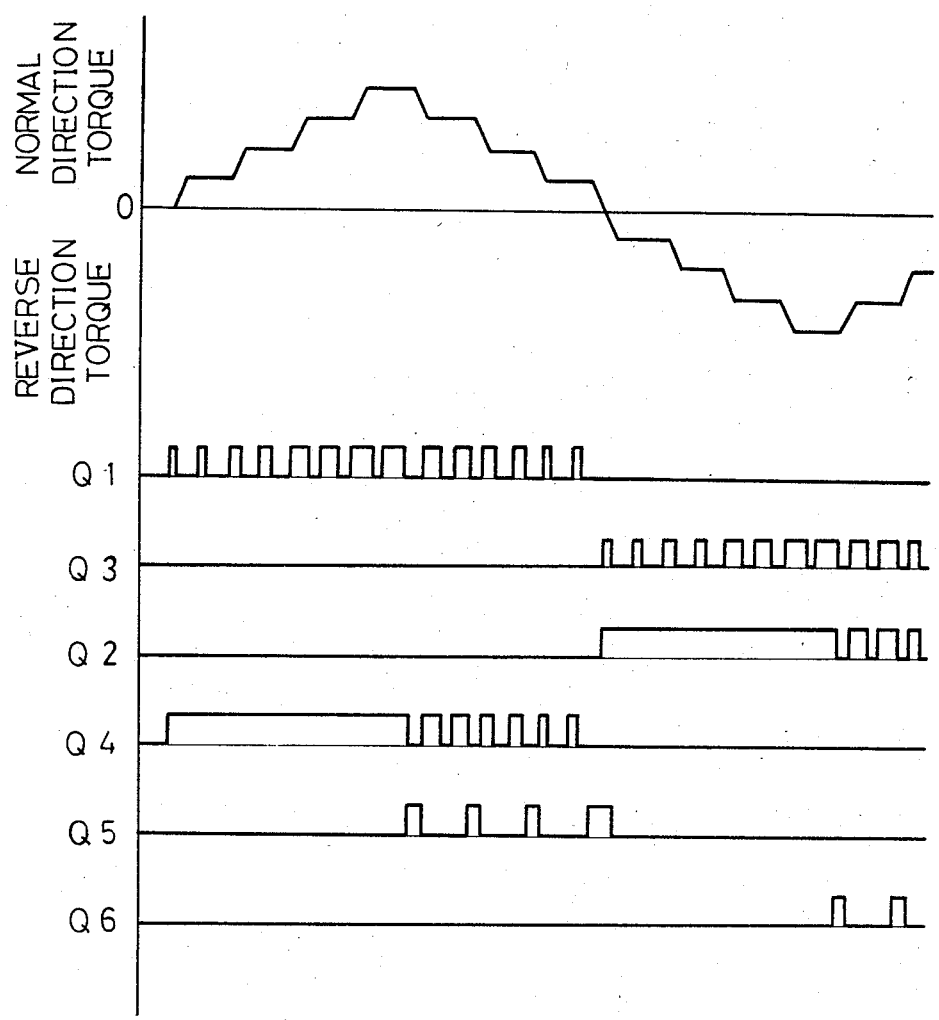
FIG. 8 is a timing chart illustrating operation timing of the embodiment of FIG. 2.

Next, the operation of the aforesaid equipment will be explained. In FIG. 7, there are illustrated explanation diagrams each of which shows the relation between the servomotor DM and a transistor to be made conductive in each operation mode. FIG. 8 is a timing chart showing an example of operation timing. FIG. 9 shows each characteristic curve of torque versus current value I, torque versus number of rotations N and torque versus efficiency in the D.C. servomotor DM used in this embodiment.

Where a car speed is slower than a speed Vm predetermined by a variable resistor VR5, there is applied a low level signal L to an input terminal F of control block B16. Under this condition, if a driver rotates the steering wheel so that torque exceeding predetermined torque is applied to the steering shaft 2, level at the input terminal A of block B16 is set to either high level H or low level L in accordance with the rotational direction thereof. While, from the pulse width modulation circuit B6, there is also applied a pulse of a predetermined width to an input terminal B of block B16. Therefore, in accordance with the rotational direction of the steering wheel, either a group of AND gates AN1, AN2 and AN9 or another group of AND gates AN3, AN4 and AN10 become logic level "1" in the output level thereof so that a photo-coupler of either a driver DV4 (corresponding to the group of AN1, AN2, AN9) or a driver DV3 (corresponding to the group of AN3, AN4, AN10) turns on. At the same time, a pulse from the pulse width modulation circuit B6 is applied to either driver DV1 or DV2 via a couple of an AND gate AN3 and the inverter IN6, or via another couple of an AND gate AN14 and an inverter IN7. The former couple corresponds to the group of AN1, AN2, AN9, and the latter couple corresponds to the group of AN3, AN4, AN10. For example, if a pulse is applied to the driver DV1, the transistor Qa turns on or off in accordance with the applied pulse. In this case, if the transistor Qa turns off, a photocoupler PC1 turns on, but the contrary, the transistor Qa turns on, the photo-coupler PC1 turns off. When the photo-couplers PC1, PC4 turn on, the transistors Q1 and Q4 turn on, whereby a current flows through the servomotor DM as shown in a normal direction rotation ON mode of FIG. 7. However, when the photo-coupler PC1 turns off, the transistor Q1 turns off thereby to cut off the current passage, resulting in an OFF mode. That is, the motor current is always controlled so as to be switched ON or OFF based on the pulse signal from block B6 via a block B16. Namely, electric power to be supplied to the motor DM is varied in accordance with the pulse width thereof so that a driving force of the motor DM can also be varied. On the other hand, when a pulse signal from block B6 is supplied to the driver DV2 via the AND gate AN14 and the inverter IN7, the transistor Q3 turns on or off in accordance with the applied pulse signal. As a result, a current flows through the servomotor DM as illustrated by an ON mode or or OFF mode in a reverse direction rotation, thereby to reverse the rotational direction of the motor DM. The load current is detected by a current transformer CT as a load current detecting means and the detected signal is fed back to the pulse width modulation circuit B6. As a result, the servo motor DM is driven with a proper current in accordance with a torque applied to the first steering shaft 2 based on the steering operation by a driver.

On the other hand, if an obstacle appears just while a vehicle makes a turn and at this time a driver suddenly rotates the steering wheel in the reverse direction against the turning direction, with a slight degree there will be caused a rapid change in the output signal of the torque sensor 8. This rapid change is detected by a comparator B8, whereby the output signal of block B8 becomes a high level H and this high level signal is applied to an input terminal D of control block B16. While, at this time, the output signal of the torque sensor 8 along with this rapid change is differentiated in block B4 so that a pulse signal which is modulated by the differential signal is applied to an input terminal C of block B16. And then, the aforesaid pulse signal, in accordance with the rotatinal direction of the steering wheel, is applied to the driver DV5 via the AND gates AN5, AN6 and AN11, or to the driver DV6 via the AND gates AN7, AN8 and AN12. Therefore, as shown in braking modes of FIG. 7, the transistor Q5 or Q6 turns on or off in accordance with the aforesaid pulse signal. When either Q5 of Q6 turns on, the servomotor DM is shorted between the two terminals thereof via the resistor R thereby to be subjected to braking. The degree of braking is defined by the pulse width of the aforesaid pulse signal, that is, the degree of change of the torque to be applied to the first steering shaft 2. When level of steering torque to be applied to the first steering shaft 2, which torque is based on the driver's steering operation, is in a dead zone of the absolute value circuit B1, in other words, level of output signal of torque sensor 8 is in that block B1, the output signal level of the absolute value circuit B1 becomes the bias signal level. In this case, the D.C. servomotor DM is driven so as to generate a predetermined torque for the third steering shaft 7 in the rotational direction thereof in accordance with the signal level (H or L) to be applied to an input terminal A of control block B16. The predetermined torque is defined by the aforesaid bias signal level. Therefore, in the case when a driver can operate the steering wheel with a small force (i.e., steering torque of a level within the aforesaid dead zone), an auxiliary torque defined by the aforesaid bias signal level is applied to the third steering shaft 7. Therefore, using the electric power steering equipment of the present invention, it is always possible to provide a smooth steering feeling.

As described above, according to the present invention, manual steering torque based on the steering operation by a driver is detected and from the detected torque, a driving force necessary to drive a motor is calculated, thereby to supply a current to the motor in response to this calculated value. Therefore, it is always possible for a driver to perform the most proper steering operation. Further, since the upper limit of the current to be applied to the motor is predetermined, the motor can be prevented from an overcurrent and an abnormal temperature rise so that poor insulation and burning caused by the aforesaid overcurrent and abnormal temperature rise are prevented.

In addition, since the motor is coupled to the input side of the steering gear means, that is the input side of manual steering torque transmission mechanism, via a reducer, it is possible to make the reduction gear ratio thereof small, thereby to decrease the reducer in size. Therefore, the electric power steering equipment of the present invention can be easily mounted in a front drive vehicle.

Although a preferred embodiment has been described, the invention is not to be limited thereby. Various modifications will be obvious to those of ordinary skill and the invention is defined only by the following claims.

I claim:

1. An electric power steering apparatus comprising:
   an electric motor;
   a manual steering torque transmission mechanism for transmitting torque of a steering wheel to a steering gear through a plurality of steering shafts coupled to one another by a plurality of coupling means for coupling said steering shafts, one of said coupling means being nearest to said steering gear;
   a motor torque transmission mechanism interposed between said steering gear and said coupling means nearest to said steering gear, and said motor torque transmission mechanism coupled to said electric motor;
   a manual steering torque detecting means for detecting the manual steering torque applied to at least one of said steering shafts of said manual steering torque transmission mechanism;
   load current detecting means for detecting a load current flowing through said electric motor;
   control means for providing an input to said electric motor based on the output signals from said steering torque detecting means and said load current detecting means, said control means supplying a load current in accordance with the detected steering torque and the detected load current, said control means limiting the maximum value of the load current not to exceed a predetermined value and said control means limiting the maximum value of the output signal level from said steering torque detecting means to a predetermined level.

2. An electric power steering apparatus according to the claim 1, wherein
   said control means prohibits the load current from being supplied to said electric motor when the value of the load current detected by said load current detecting means is in excess of the predetermined value.

3. An electric power steering apparatus according to claim 1, wherein
   said steering gear comprises a rack and pinion and one of said steering shafts is coupled to said pinion,
   said plurality of steering shafts comprise three shafts, and said plurality of coupling means comprise two universal joints, and
   said motor torque transmission mechanism is coupled to said one of said steering shafts to which said pinion is coupled.

4. An electric power steering apparatus according to claim 1, wherein
   said control means includes
      a comparator for judging polarity of the output signal from said steering torque detecting means, and
      a logic circuit for controlling the direction of said load current flowing through said motor in accordance with said polarity thereof.

5. An electric power steering apparatus according to claim 1, wherein
   said control means includes
      a differentiation circuit for differentiating the output signal from said manual steering torque detecting means,
      a comparator for comparing said differentiated value with a predetermined comparison value,
      a logic circuit for prohibiting said load current from being supplied to said electric motor in accordance with an output signal from said comparator,
      a pulse width modulation circuit for modulating the pulse width of a square wave from an oscillator in accordance with said differentiated value out of said differentiation circuit, and
      a motor braking circuit which is driven by the output signal from said pulse width modulation circuit.

6. An electric power steering apparatus according to claim 1, wherein
   said control means includes
      a pulse width modulation circuit for modulating the pulse width of a square wave from an oscillator in accordance with an absolute value of the output signal from said manual steering torque detecting means, and
      a driving circuit for driving said electric motor by the output signal from said pulse width modulation circuit.

7. An electric power steering apparatus according to claim 6, wherein
   said control means includes
      a limiter for preventing said absolute value from exceeding a predetermined value.

8. An electric power steering apparatus according to claim 6, wherein
   said control means includes
      a pulse width modulation circuit for modulating the pulse width of a square wave from an oscillator in accordance with the absolute value of the output signal from said steering torque detecting means and the value of load current flowing through said electric motor.

9. An electric power steering apparatus according to claim 1, wherein
   said control means includes
      a conversion circuit for converting a pulse wave having a frequency which is in proportion to the car speed, into an analog signal, which has a voltage corresponding to said frequency, and
      a logic circuit for interrupting supply of the load current to said electric motor when the output signal of said conversion circuit exceeds a predetermined value.

10. An electric power steering apparatus according to claim 6,
    wherein said control means includes an absolute value circuit for converting polarity of a signal from said manual steering torque detecting means into positive polarity, and adding a certain positive voltage to said converted signal.

11. An electric power steering apparatus comprising:
    an electric motor;
    a manual steering torque transmission mechanism for transmitting torque of a steering wheel to a steering gear through a plurality of steering shafts coupled to one another by a plurality of coupling means for coupling said steering shafts, one of said coupling means being nearest to said steering gear, said steering gear comprising a rack and pinion and one of said steering shafts being coupled to said pinion, said plurality of steering shafts comprising three shafts, and said plurality of coupling means comprising two universal joints;

a motor torque transmission mechanism interposed between said steering gear and said coupling means nearest to said steering gear, and said motor torque transmission coupled to said electric motor, and said motor torque transmission mechanism is coupled to said one of said steering shafts to which said pinion is coupled;

a manual steering torque detecting means for detecting the manual steering torque applied to at least one of said steering shafts of said manual steering torque transmission mechanism; and control means for providing an input to said electric motor based on the output signals from said steering torque detecting means, said control means supplying a load current in accordance with the detected steerng torque.

12. An electric power steering apparatus according to claim 11, wherein said control means includes a linear amplifier for amplifying the output signal from said manual steering torque detecting means, an absolute value circuit for converting polarity of the output signal from said linear amplifier into positive polarity, an amplifier for amplifying the output signal from said absolute circuit in case said signal level is below a certain value, said amplifier outputting constant level signal in case said signal level is above said certain value, a pulse width modulation circuit for modulating the pulse width of a square wave from an oscillator in accordance with the output signal from said amplifier, a logic circuit for outputting high level signal or low level signal in accordance with polarity of the output signal from said linear amplifier, and a control block for deciding a value of said load current in accordance with the output signal from said pulse width modulation circuit, and for deciding polarity of said load current in accordance with the output signal from said logic circuit.

13. An electric power steering apparatus according to claim 12, wherein said control means includes a conversion circuit for converting a frequency signal being in proportion to the car speed into voltage signal, a comparator for outputting a high level signal in case the output signal level from said conversion circuit is above a certain value;

said control block braking said motor when the output signal from said comparator equals said high level signal.

14. An electric power steering apparatus according to claim 11, wherein said manual steering torque detecting means is fixed to said steering shaft nearest to said steering wheel.

15. An electric power steering apparatus according to claim 11, wherein said motor torque transmission mechanism is a reducer comprising four gears engaged in one another.

* * * * *